No. 805,930. PATENTED NOV. 28, 1905.
J. L. MULLER & J. BONNET.
MACHINE FOR MANUFACTURING INCANDESCENT MANTLES.
APPLICATION FILED DEC. 11, 1900.
13 SHEETS—SHEET 1.
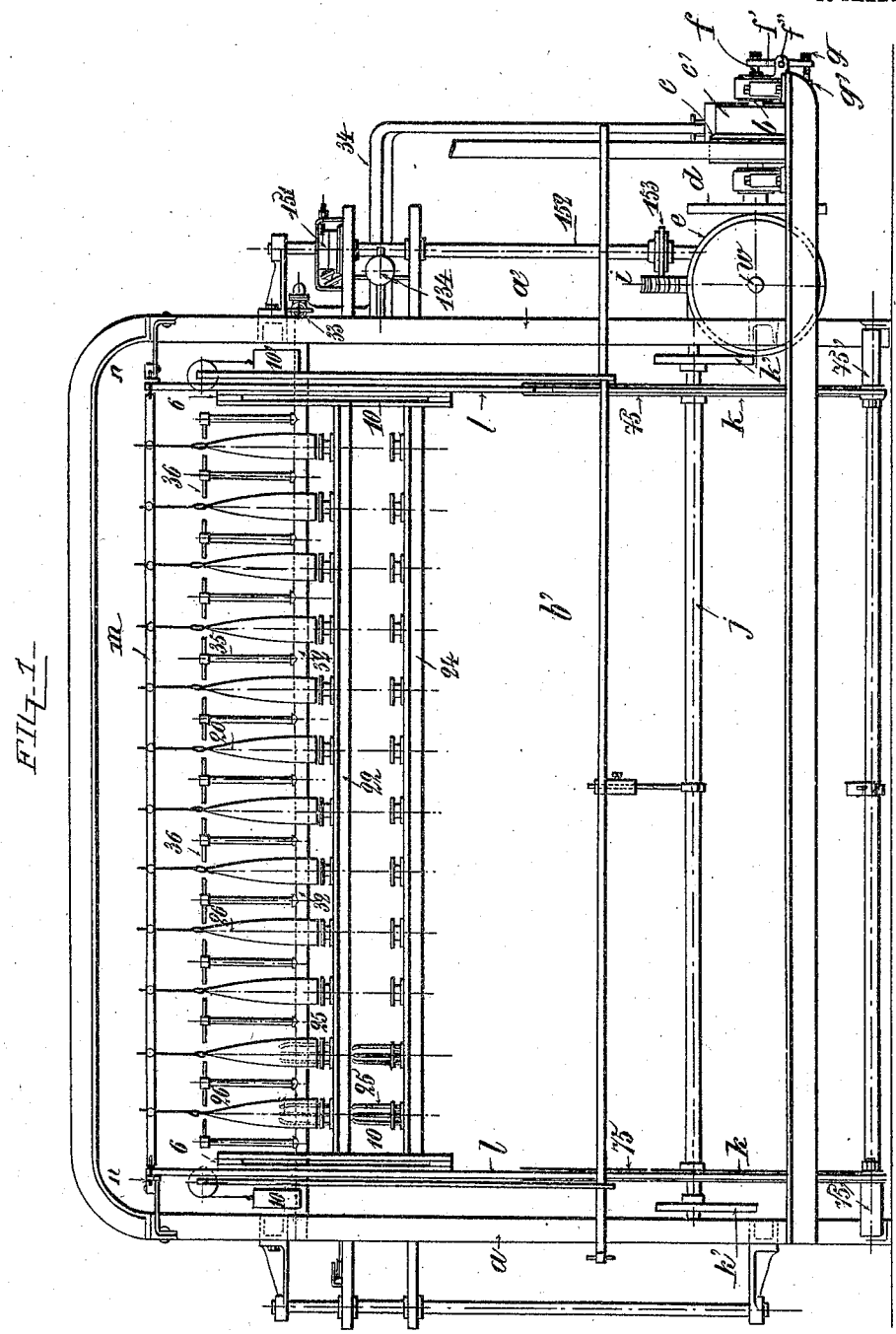
WITNESSES:
INVENTORS

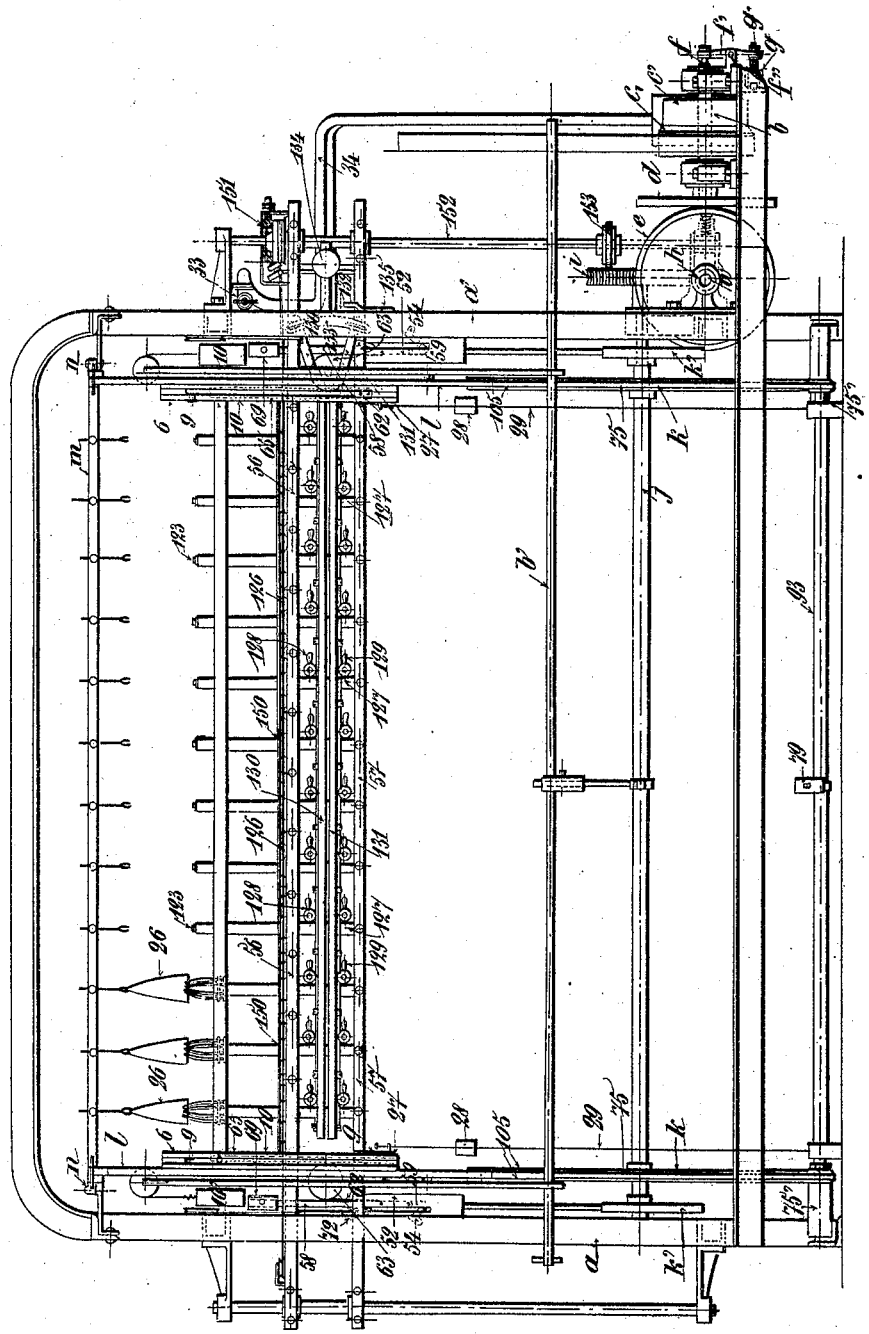

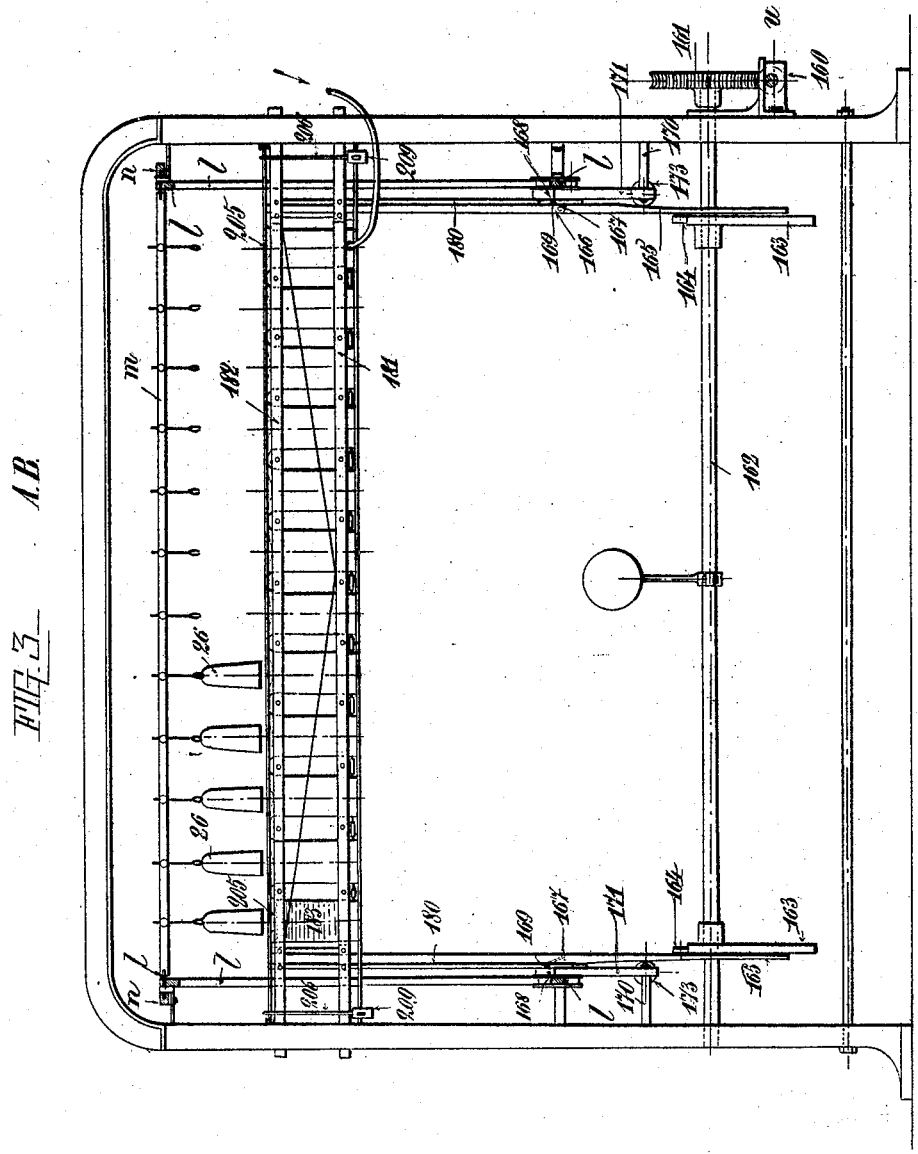

No. 805,930. PATENTED NOV. 28, 1905.
J. L. MULLER & J. BONNET.
MACHINE FOR MANUFACTURING INCANDESCENT MANTLES.
APPLICATION FILED DEC. 11, 1900.
13 SHEETS—SHEET 4.
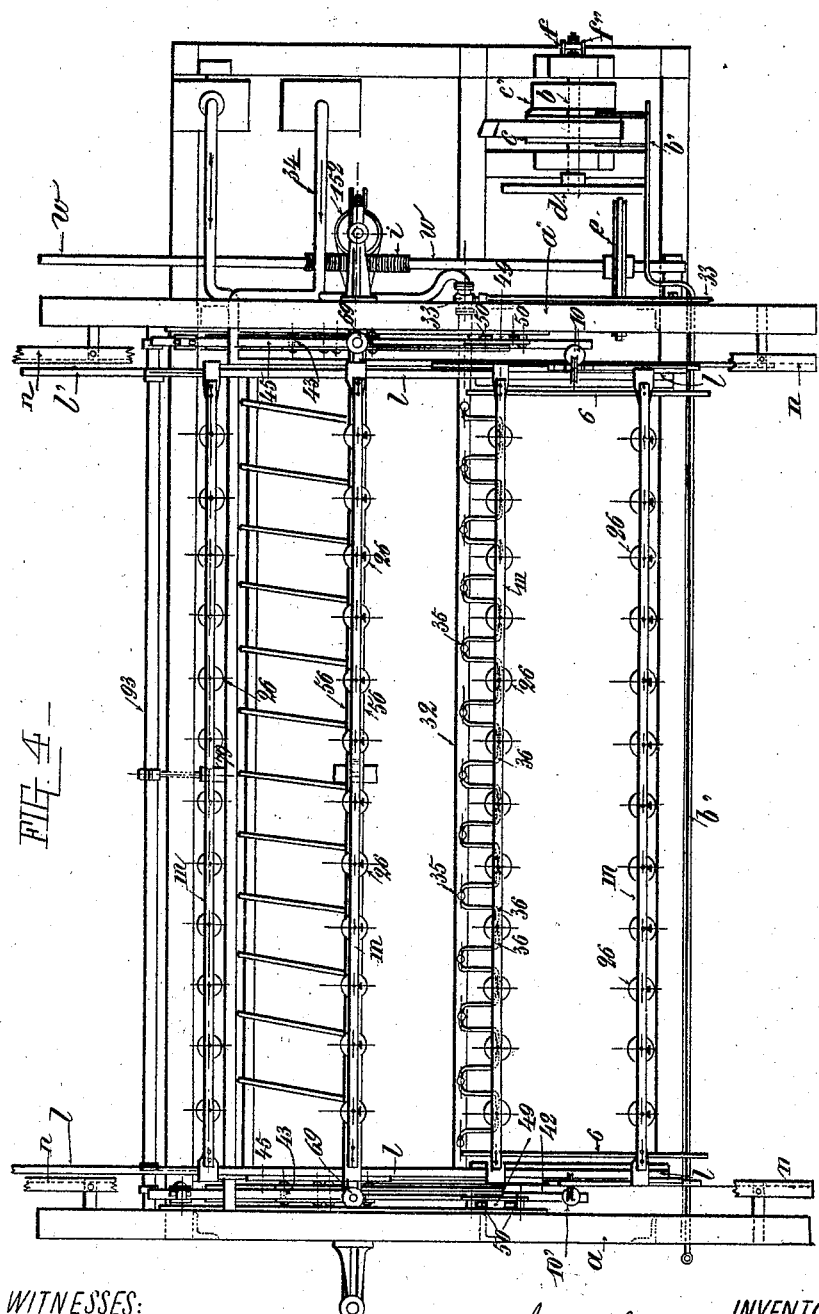

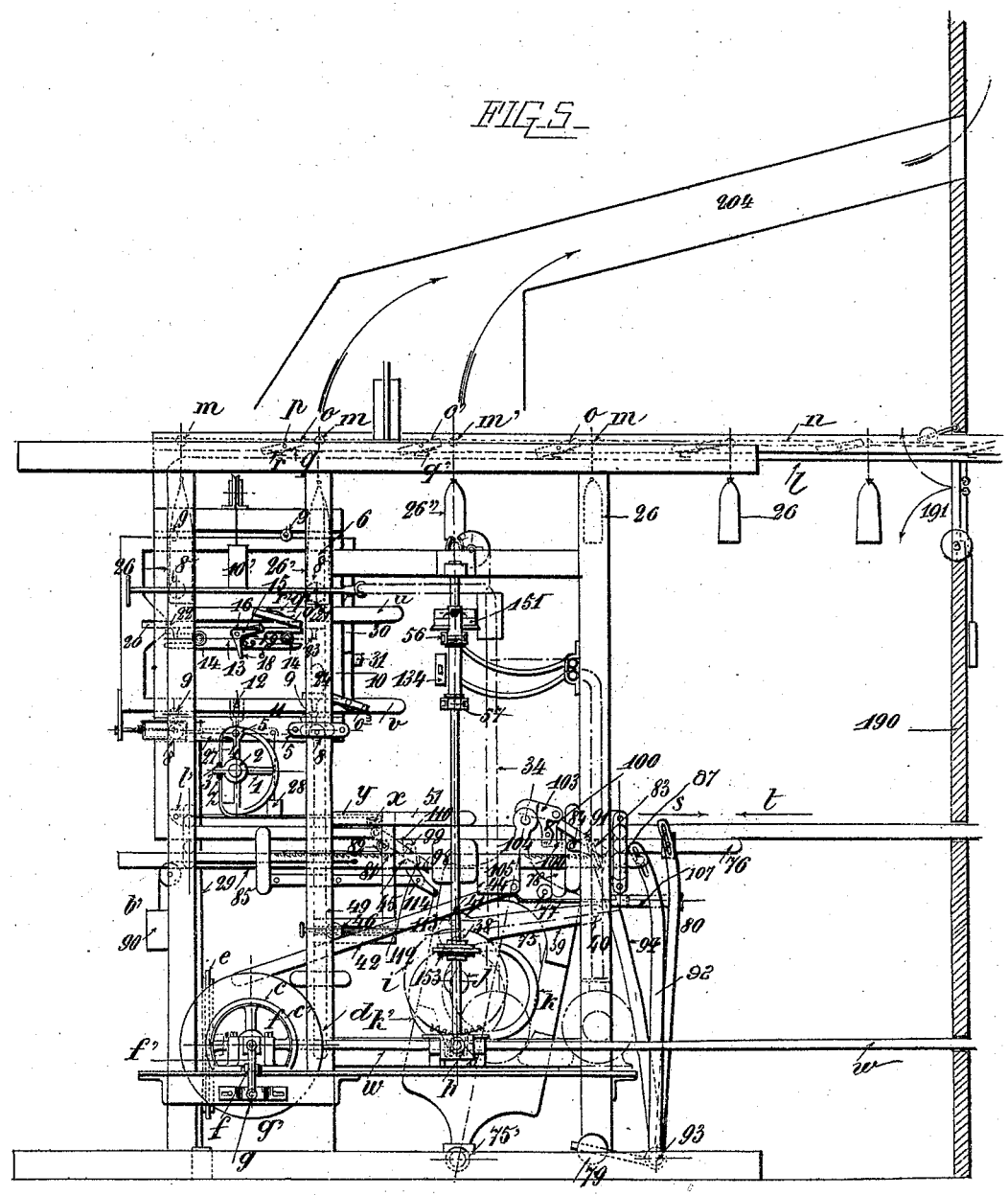

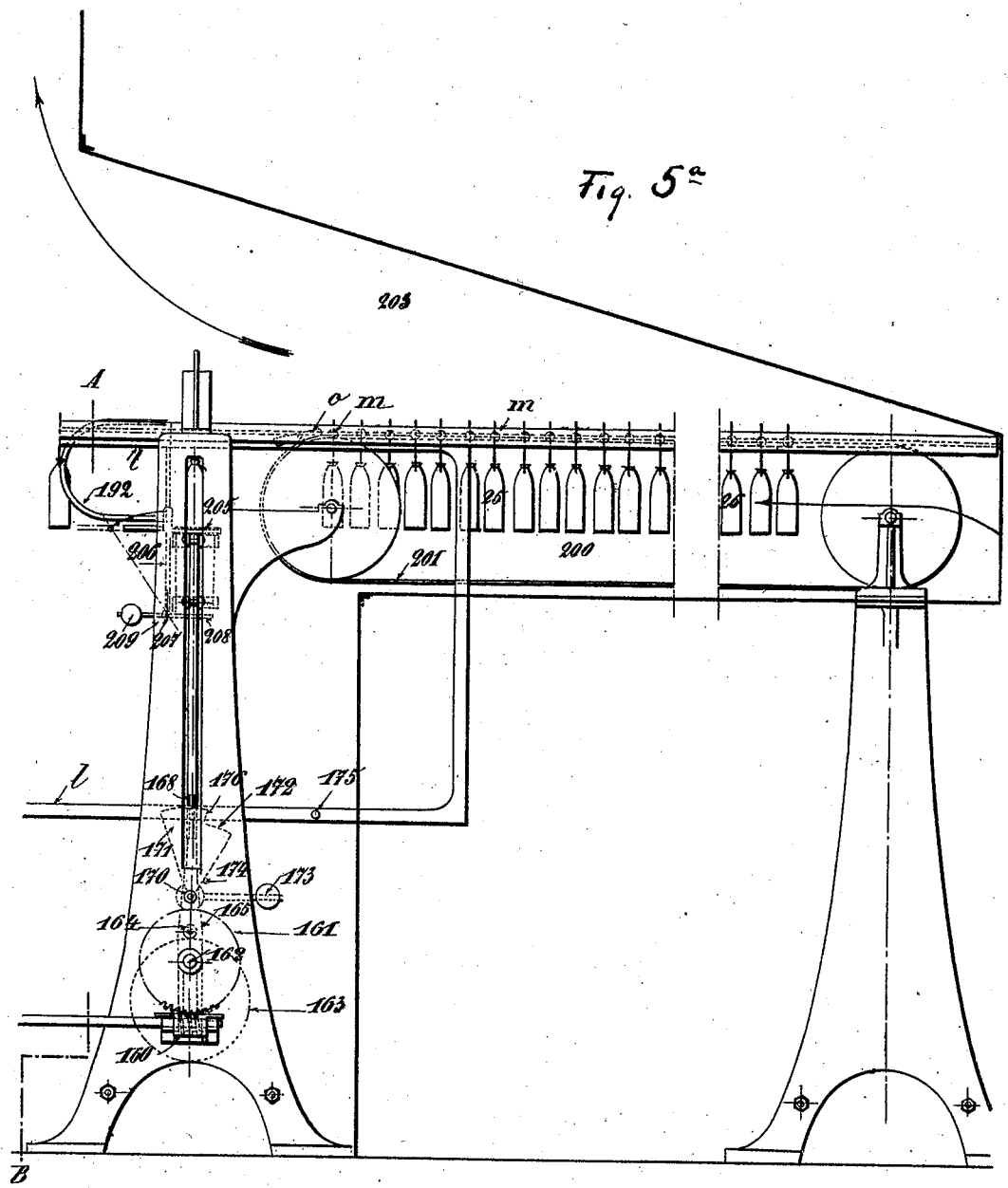

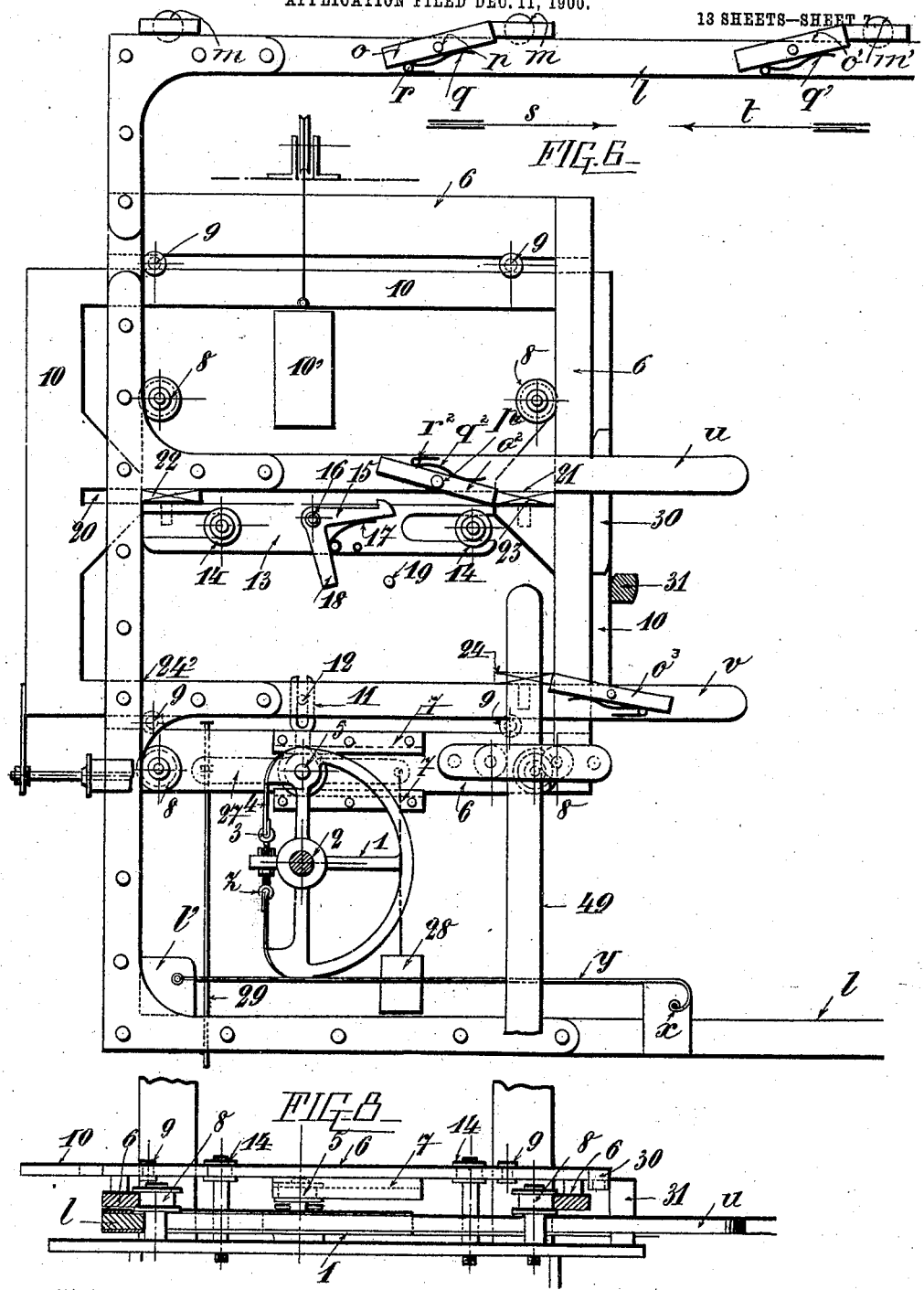

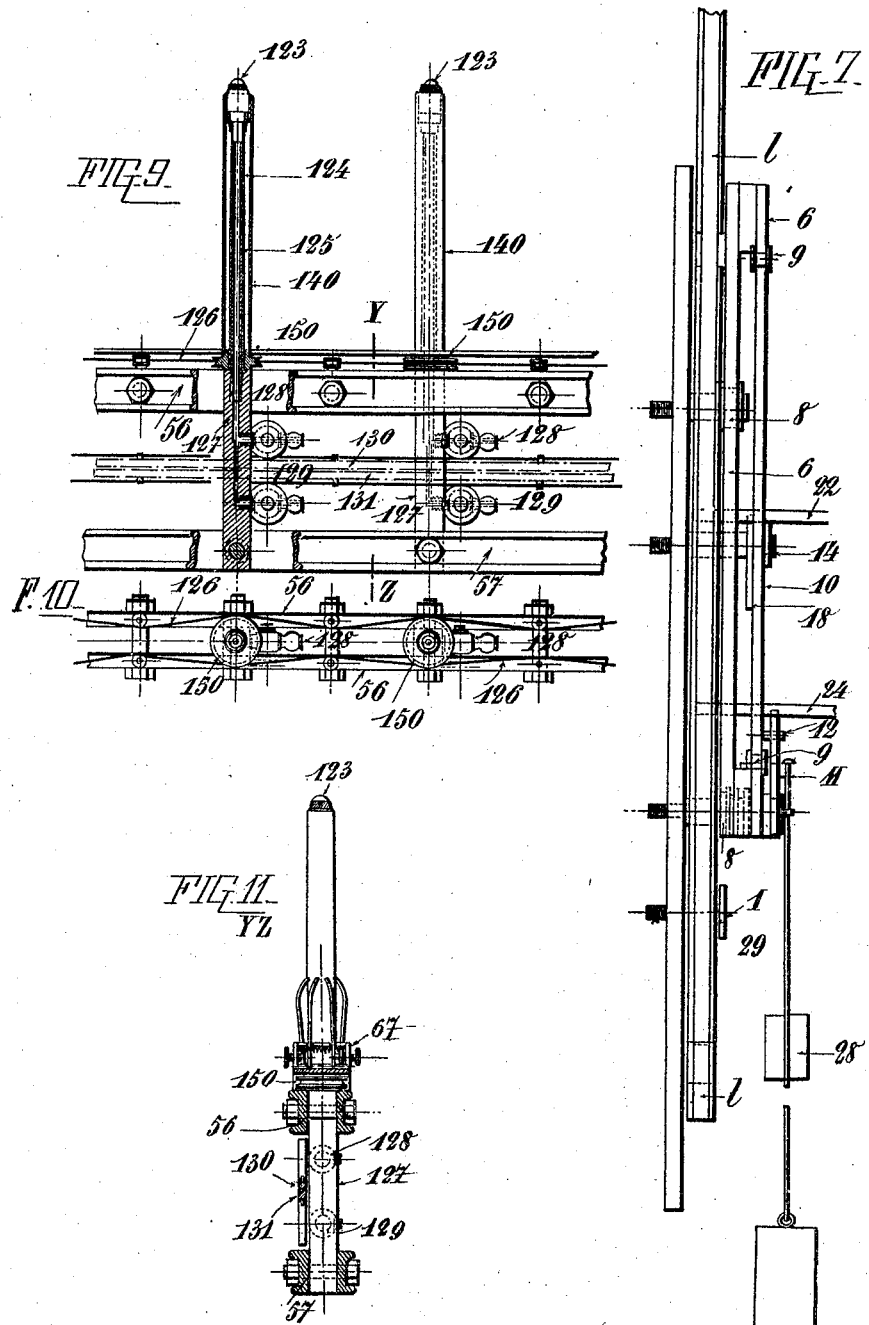

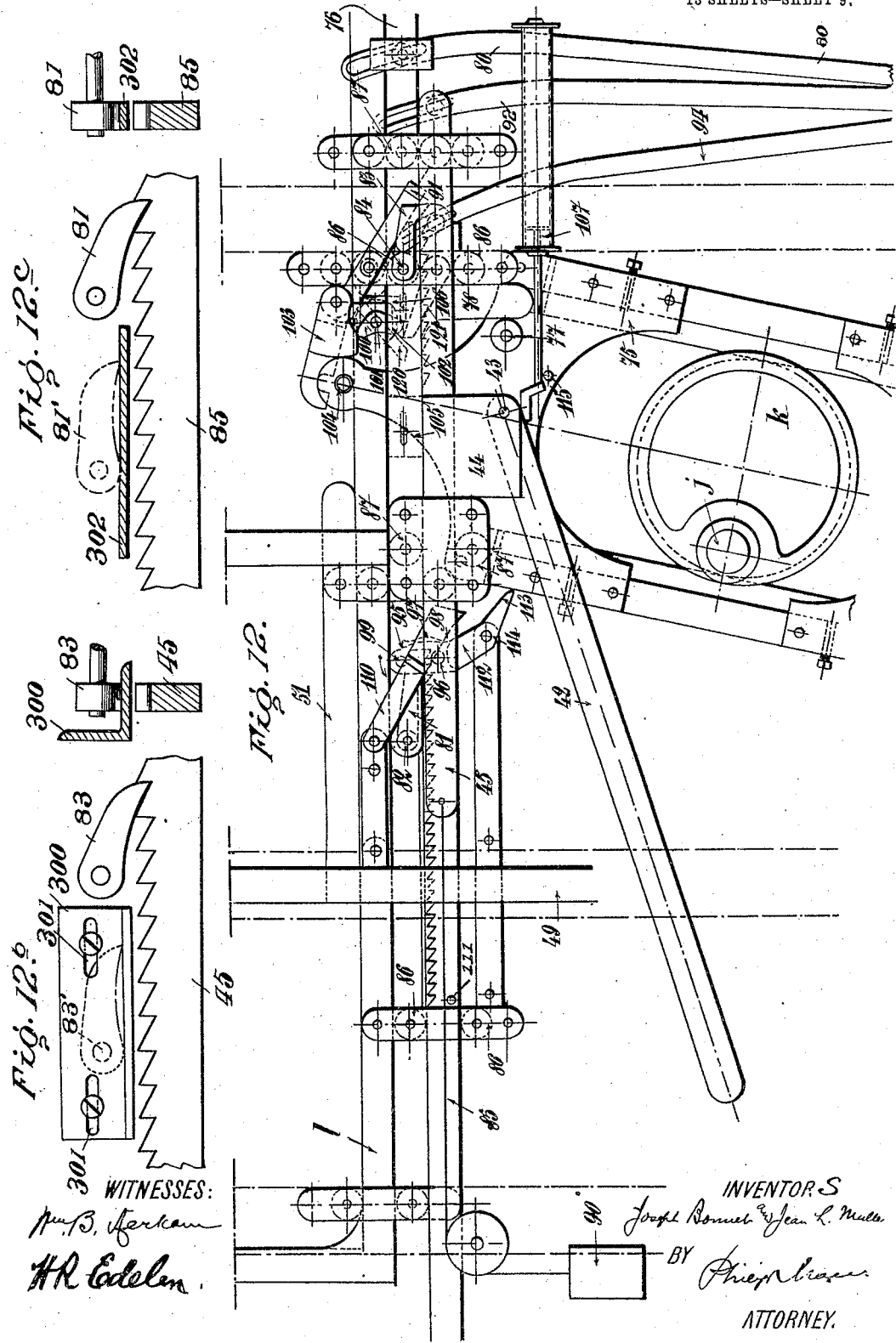

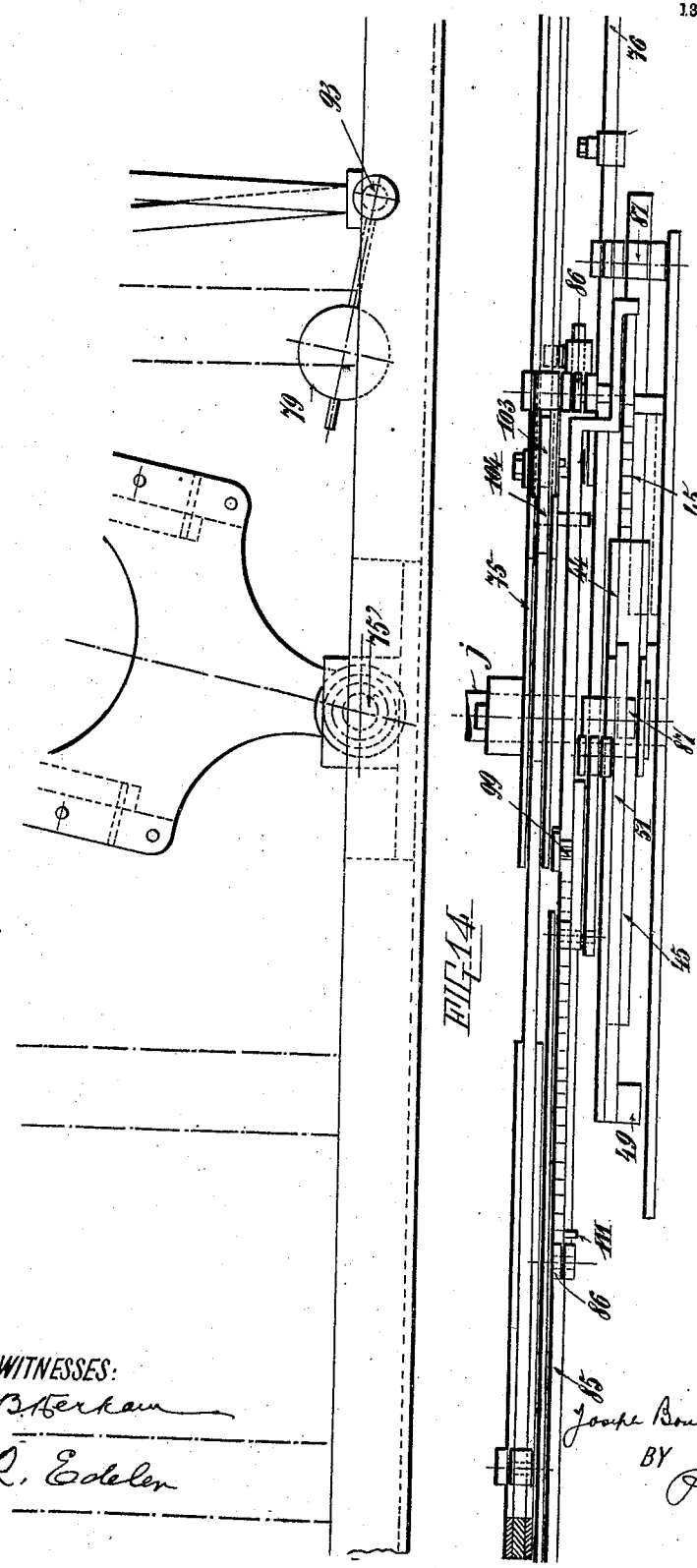

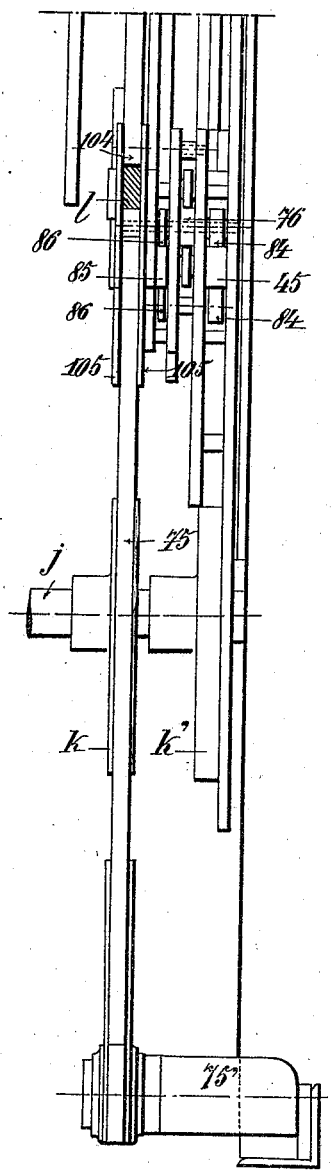

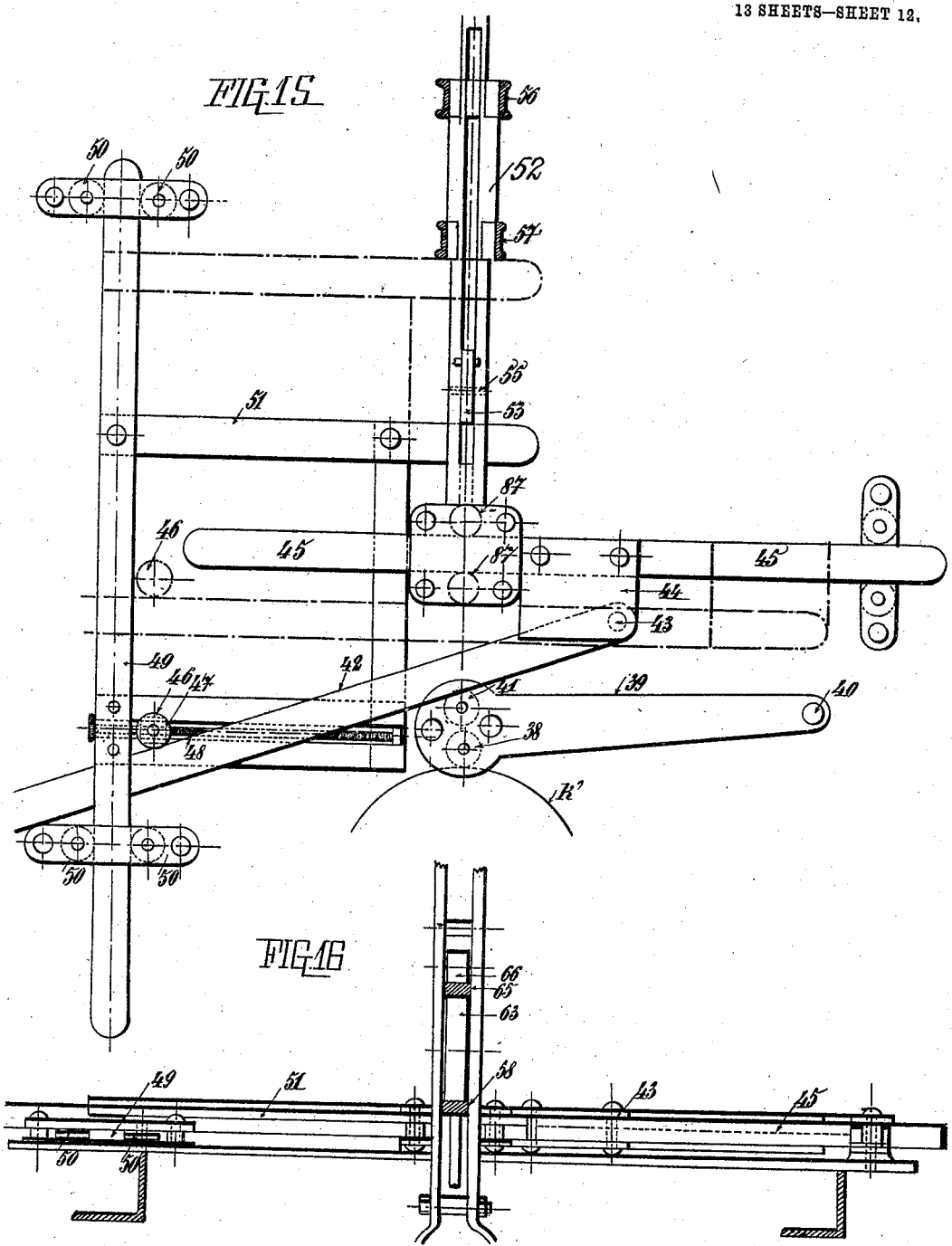

No. 805,930. PATENTED NOV. 28, 1905.
J. L. MULLER & J. BONNET.
MACHINE FOR MANUFACTURING INCANDESCENT MANTLES.
APPLICATION FILED DEC. 11, 1900.

13 SHEETS—SHEET 13.

FIG. 17

WITNESSES:

INVENTORS
Joseph Bonnet & Jean L. Muller
BY
ATTORNEY.

UNITED STATES PATENT OFFICE.

JEAN LEON MULLER, OF SANNOIS, NEAR PARIS, AND JOSEPH BONNET, OF PARIS, FRANCE.

MACHINE FOR MANUFACTURING INCANDESCENT MANTLES.

No. 805,930.            Specification of Letters Patent.            Patented Nov. 28, 1905.

Application filed December 11, 1900. Serial No. 39,550.

*To all whom it may concern:*

Be it known that we, JEAN LEON MULLER, a resident of Sannois, near Paris, and JOSEPH BONNET, a resident of Paris, France, citizens of the Republic of France, have invented a new and useful Improvement in Machines for Manufacturing Incandescent Mantles, which improvement is fully set forth in the following specification.

This invention relates to a machine for the manufacture of incandescent mantles, and has for its object to provide an apparatus which shall mechanically effect the following operations: first, the firing of the mantles previously prepared and steeped in a solution of the oxids of rare metals, this firing of the mantles, heretofore effected by hand, having for its object the burning of the textile material covered with a layer of the oxid; second, the calcination of the skeleton or frame which remains after the firing of the mantle, and, third, the steeping of the mantle thus calcined in a collodion-bath or other substance for the purpose of preserving the mantle.

In order that the invention may be clearly understood and readily carried into effect, we will now proceed to describe the same more fully with reference to the accompanying drawings, in which—

Figure 1 is a front elevation of our improved apparatus and showing the means for producing the firing of the mantles. Fig. 2 is also a front elevation of the apparatus, but with the firing means omitted therefrom, so as to give a clear view of the calcinating means. Fig. 3 is a front elevation showing the steeping mechanism, and for this purpose the firing and the calcinating means have been omitted. Fig. 4 is a partial plan of the machine, showing the firing and the calcinating means. Fig. 5, together with Fig. 5$^a$, is a longitudinal section of the machine, taken at right angles to Figs. 1, 2, and 3. Fig. 6 is a side elevation showing the mechanism for removing the mantles from their first position in the machine to that for firing. Fig. 7 is a face view of the mechanism shown in Fig. 6. Fig. 8 is a plan corresponding to Fig. 7. Figs. 9, 10, and 11 are a front elevation, plan, and a side elevation, respectively, of the calcinating means, but drawn to a larger scale. Fig. 12, together with Figs. 12$^a$, 13, and 14, represent a side elevation, front elevation, and plan, respectively, drawn to a larger scale, of the mechanism provided at each side of the machine for operating the firing and the calcination of the mantles and also for regulating the period of calcination. Figs. 12$^b$ and 12$^c$ are detail views. Figs. 15, 16, and 17 are a side elevation, plan, and front elevation, respectively, also drawn to a larger scale, of the mechanism provided at each side of the machine for operating the calcinating-burners.

We will divide the description of our machine in four main parts.

First. Description of feeding the mantles into the machine and of the parts for conveying the mantles to the position for firing.

Second. Description of the means employed for effecting the firing and of the means for conveying the mantles after firing into the position for calcinating.

Third. Description of the calcinating mechanism and of the parts for conveying the mantles after calcination into the position for steeping.

Fourth. Description of the steeping means and of the mechanism for delivering the mantles outside the machine by conducting them through a drying-chamber.

Referring to the first part of the description above mentioned, we would here remark that the mantles employed in our machine are woven from any appropriate textile material upon a suitable machine, then steeped in a solution of oxids of rare earths or precious metal, and the mantles thus prepared and dried may be placed directly in the machine with the object of subjecting them mechanically to the firing and calcinating operation and subsequent steeping and drying.

The frame supporting the different parts of the machine consists, essentially, of two standards $a\ a'$, Fig. 4, supporting horizontal bars or frames, which serve to unite the said two standards and to carry the various mechanisms and parts of the machine. Upon the shaft $b$, Figs. 1, 2, 4, are mounted two pulleys, one, $c$, being fast and one, $c'$, being loose, which permit either the machine to be driven or to be stopped by operating the belt-shifting fork $b'$. The shaft $b$ is fitted at $d$ with a friction-disk giving motion to a friction-wheel $e$, keyed upon the horizontal shaft $w$, disposed parallel to the standards $a\ a'$. To maintain a proper adherence between the disk $d$ and wheel $e$, the shaft $b$ is mounted at $f$ upon a point mounted at the end of a rocking lever $f'$, fulcrumed at $f''$ and fitted with a set-screw $g$, pressing against a spring $g'$. The horizontal shaft $w$ is formed with an endless screw or worm $h$ in gear with a toothed wheel $i$, Figs. 1, 2, 4, 5, keyed upon the driving-shaft $j$ of the machine and having keyed upon it at each side of the machine within the standards $a\ a'$ two eccentrics $k\ k'$. The eccentrics $k$, one of which is shown to a larger scale at Fig. 12, are designed to impart an intermittent reciprocatory motion at regulable intervals to two movable frames $l$, disposed at each side of the machine, as is more clearly shown in detail in Fig. 6. Each such movable frame is of rectangular form and composed of metal bars, the upper bar of which is furnished with pawls $o$, adapted to operate rods terminating at their extremities in suitable bars or cross-pieces $m$, which slide in grooves $n$, provided in the upper bars of the fixed frame $a\ a'$, Fig. 2.

Each pawl $o$ is constructed in the following manner: It consists of a small plate $o$, capable of pivoting around a pin $p$, Fig. 6, and is subjected to the action of a spring $q$, tending constantly to maintain the said pawl lifted in such a manner as to cause its rear end to strike against a stop $r$.

The displacement of the rods is effected as follows: When the movable frames $l$, which of course are displaced at the same time and synchronously are moved in the direction of the arrow $t$ by the action of the eccentrics $k$, the rods remain stationary, as the pawls $o$ do not act upon them. From Fig. 6 it will be seen that during this displacement the pawl $o'$ abandons the rod $m'$ and takes up the position of the pawl $o$ against the rod $m$ after having previously passed and lowered itself beneath said rod $m$. During its passage beneath the rod $m$ the pawl $o'$ is enabled to yield by compressing the spring $q'$; but the rod cannot be lifted, as its extremities are engaged in the grooves $n$, as hereinbefore explained. On the contrary, when the frame $l$ is displaced by the action of the eccentric in the direction of the arrow $s$, Fig. 6, the pawls, being raised by the action of their springs $q$, displace the rods in front of them, and thus all the rods move along the machine the distance between two consecutive pawls.

To be quite clear, we would here repeat that the two movable frames $l$, placed at each side of the machine, each carry the same number of pawls disposed exactly opposite to each other, and each rod is thus actuated at each of its extremities by means of a pawl. The rods $m$ (thus actuated by the pawls) having flattened extremities are caused to move in the before-mentioned grooves and carry a variable number of mantles. This number of mantles depends on the capacity of production of the machine and the number of firing and calcinating burners with which the machine is fitted. We reserve to ourselves the construction of machines with any number of burners.

In the example of a machine shown in the accompanying drawings there are shown twelve burners for firing and twelve burners for calcinating the mantles. Each rod $m$ will therefore carry twelve mantles properly spaced and suspended by clamping-hooks or the like.

Each of the movable frames $l$ previously referred to and which performs an intermittent to-and-fro motion at regulable periods in the directions of the arrows $t$ and $s$, Fig. 6, carries two arms $u$ and $v$. As everything is symmetrical for each of the frames $l$, we shall only describe the parts in connection with one of the frames, it being understood that the other frame is fitted with the same parts disposed symmetrically facing it. The arm $u$ carries a pawl $o^2$, identical to those already described and mounted on a pivot $p^2$, while the action of a spring $q^2$ presses one of the ends of the pawl $o^2$ against the stop $r^2$. So, also, the arm $v$ carries a similar pawl $o^3$; but this latter is disposed in an inverse direction to that upon the arm $u$.

Upon the movable frame $l$, Fig. 6, there is fixed at $x$ a steel blade $y$, fixed at $z$ upon a cam 1 on a shaft 2. At the point 3 upon the same cam 1 there is fixed another blade 4, attached by its other end at $l'$ to the frame $l$. Owing to the lateral movement of the frame $l$, the cam 1 is caused to turn on its shaft 2 at times in the one direction and then in the other, and thereby causes the roller 5, fixed to the upper portion of the said cam, to impart vertical motion to the auxiliary frame 6, fitted with two rails 7, between which the roller 5 is guided. The frame 6 is guided in its vertical movements by rollers 8, Fig. 6. The auxiliary frame 6 itself is fitted with and carries rollers 9, upon which another auxiliary frame 10 can move horizontally. The horizontal motions of the auxiliary frame 10 are produced by the fork 11 in engagement with a stud 12, fixed to the frame 10. The rocking of the fork 11, engaging the stud 12, imparts a corresponding reciprocatory motion to the frame 10, as more fully explained hereinafter.

At 13 there is a plate adapted to move at the same time as the frame 10 and is guided by the two rollers 14, fixed upon the machine-frame, which also carries the rollers 8. This movable plate 13 is furnished with a hook 15, pivoted at 16 and subjected to the action of a spring 17. The movement of the said plate in one direction brings the tail 18 of the hook against a stop 19, causing it to drop below the upper edge of the plate. The frame 10 is formed with two slots 20 and 21 at the front and the rear end, respectively.

At right angles from the sides of the frames project three bars 22 23 24, the two former of which are disposed at a higher level than the third. As shown in Fig. 6, bar 22 is supported at opposite ends on plates 13, bar 23 is supported in slots 21 of frame 10, and bar 24 rests at its opposite ends on bars $v$ of frame $l$. These bars or traverses, as shown at the left in Fig. 1, carry forms 25, of glass or metal blades or other convenient material, designed to take into the mantle in order to keep it in its proper shape—i. e., open—during the operation of firing. The frames $l$, 6, and 10 being at rest, the mantles 26 are placed upon the bar or traverse 22 around the forms 25 by suspending them to the rod $m$ by means of suitable clamps. Meanwhile those mantles which have already been moved once are arranged above the bar 23 and on the forms carried by the latter, and these are at this movement subjected to the firing process, as will be explained hereinafter. In the position of the parts shown in Fig. 6 the operation of the firing is finished, as is also the charging, and the frame $l$ by the action of the eccentric $k$ is caused to retire in the direction of the arrow $t$. This retiring motion has the effect of producing under the action of the blades $y$ and 4 partial rotation of the cam 1, which in turning produces, by means of the roller 5, the downward displacement of the frame 6, which takes with it the frame 10, owing to the latter being guided by the rollers 9, supported by the frame 6. Owing to the lowering of the frames 6 and 10, the bar 23, which carries the forms placed in the mantles already fired, descends, while the bar 24 is displaced in the direction of the arrow $t$ by the action of the pawl $o^3$, mounted upon the bars $v$ of the frame $l$. At the finish of this movement the bar 24 has arrived at 24′, while the bar 23 has moved into the position previously occupied by the bar 24. During the same movement the pawls $o^2$, mounted upon the bars $u$ integral with the frames $l$, are moved so as to engage with the bar 22, carrying forms taking into the interior of the mantles which have just been placed in the machine. The lower transverse bar of the frame 6 carries a pivot upon which oscillates a beam 27, having attached to one end a weight 28 and to its other end a rod 29, carrying a weight double the weight 28. When the frame has moved to its lowermost position, as hereinbefore explained, the weight at the end of the rod 29 touches the ground, and thus the beam 27 is only subjected to the action of the weight 28; but this latter has no effect upon the frame 10 as long as the projection 30 of the said frame 10 is not free of the fixed stop 31. As soon as this projection 30 is raised above the stop 31 the frame 10 is no longer retained horizontally, and it can under the action of the weight 28 of the beam 27, which carries the fork 11, perform a slight movement from the left to right in the direction of the arrow $s$. This lateral motion effects the retention of the bar 24, which at that moment is in the position 24′ in the groove 20, situated opposite it. By the action of the eccentric $k$ the frame $l$ returns now in the direction shown by the arrow $s$, and the action of the blades $y$ and 4 and cam 1 causes the frames 10 and 6 to move vertically upward. In this displacement the bar 24, occupying the position 24′, takes up the position of the bar 22, which latter is moved at the same time with the frame $l$ by the action of the pawl $o^2$ of the bar $u$ into the position previously occupied by the bar 23, which at this moment is in the position 24. During the elevation of the frames 10 and 6 the beam 27 is operated by the rod 29 with its weight. The beam 27 therefore turns in the opposite direction to that of its first rotation and the fork 11 acts upon the stud 12 in such a manner as to impart to the frame 10 a motion from right to left—i. e., in the direction of the arrow $t$. This displacement causes the disengagement of the groove 20 from the bar 24 and, on the contrary, engaging the groove 21 with the bar 22. It will be well understood that owing to the projection 30 and stop 31 this slight motion from right to left can only take place at the end of the upward motion of the frame 10. It should be remarked that while descending the projection 30 is on the left of the stop 31, Fig. 6, and while ascending it is on the right of the said stop. At the end of this movement all the parts are in the initial position, with the only difference that the bar 22 occupies the position previously occupied by the bar 23, which occupies the position previously occupied by the bar 24, while this latter occupies that previously occupied by the bar 22. These various bars carry forms designed to keep the mantles open. Upon those mounted upon the bar 24 the operator places a fresh series of mantles. Those mounted upon the bar 22 engage the mantles subjected to the firing operation, while those of the bar 23 are unoccupied, because they are freed from the mantles last subjected to firing. The same cycle of operations are produced in the same manner at every to-and-fro motion of the frames $l$. In the different displacements of these frames it should be remembered that the bars $m$ are moved with the frames $l$ in the direction indicated by the arrow $s$, thus accompanying the bars which carry the forms in their horizontal displacement in the same direction.

In the foregoing description we have presumed the frames $l$ to be moved at intervals, which may be regulated at will in one or other direction. We shall later on when describing the operation of the parts for calcinating see how these intervals between the displacements may be regulated. In order to reduce the effort to overcome the weight of the frame 10, the frame 6 and the bars are provided with a counterpoise 10′, Fig. 6.

Referring now to those parts employed for the firing and to those producing the removal of the mantles from the position where they have been fired to that for calcinating, the firing is effected when the mantles are above the bar occupying the position 21, Fig. 6.

We shall now describe the parts which produce the firing of the mantles, Fig. 1.

At 32 is a suitable gas-pipe fitted with a tap 33. This pipe is connected by a branch pipe with a counting mechanism. The pipe 32 is further fitted with a number of vertical tubes 35, so arranged as to place each mantle between two such tubes 35, and these latter have small branch tubes 36 projecting sidewise and serving to ignite the mantles at their upper portion. The textile material thus ignited burns slowly by degrees from the top downward to its lower end. The removal of the mantles after firing is effected by the displacement of the frames $l$ in the direction of the arrow $s$, Fig. 6, which occurs, as we have seen previously, after the forms 25 have left the mantles 26. This removal from the firing position to the calcinating position is effected by the action of the pawls $o$, disposed at the upper part of the frame $l$.

We will now describe the arrangement for calcination and for removing the mantles after calcination into the position for steeping.

The calcination is produced in the machine when the mantles 26 have been brought into the position 26″, Fig. 5. As has already been stated, the driving-shaft $j$ is fitted with two eccentrics $k$ and $k'$, one at each side of the machine. The eccentric $k'$, Fig. 15, acts by rotating against a roller 38 upon a lever-arm 39, fulcrumed at 40. This lever-arm carries a second roller 41, revolving against a bar 42, pivoted at 43 upon the plate 44, firmly secured to the bar 45. As will be more fully described hereinafter, the said bar 45 performs a progressive motion from left to right, so that the fulcrum 43 is displaced toward the right, Fig. 15, and thereby modifying at every moment the position of the bar 42, lifted by the eccentric $k'$. By reason of this displacement of the pivot 43 toward the right the stroke of the bar 42 gradually decreases, and when it arrives at its minimum limit the bar 45 returns suddenly from the right to the left through the action of a disengaging device, hereinafter described, and thus the bar 42 is returned to its maximum limit of stroke. The bar 42 acts during these displacements upon a roller 46, mounted upon a screw-nut 47, adapted to move along a screw 48, secured to an upright post 49. Owing to the position occupied by the roller 46, the extent of motion of the post 49 at any moment can be regulated at will. The said post 49 is guided between rollers 50, mounted on suitable supports, and it is fitted with an arm 51 at right angles to it and moving in a slot formed in the piece 52. When the nose 53, Fig. 17, of the hook 54, pivoted at 55, engages in the slot of the piece 52, the arm 51 of the post 49 while ascending takes with it the hook 54, and consequently also the whole piece 52, to which the said hook is secured. To the piece 52 are fixed two bars 56 and 57, carrying burners for effecting the calcination and the forms for the mantles which may have become closed during their displacement. A bar 58, Fig. 17, arranged to move vertically in a vertical way in piece 52, carries at its lower end a hook 61, pivoted thereto at 60. A flexible band 62, attached to bar 58 above pivot 60, passes upwardly over pulley 63, journaled in a cross-bar 64, connecting bars 56 and 57. The other end of band 62 is attached to the lower extremity of bar 65, guided by rollers 66 and, together with a similar arrangement at the other side of the machine, supports bar 67 and the forms mounted directly thereon. Bar 58 transmits ascending and descending movements to bar 67 through the intermediary of band 62. The bar 58 is formed with a projection 68, the use of which is hereinafter explained, and at its upper end it carries a counterpoise 69 for entirely equilibrating the weight of the bars 65, bar 67, and the forms carried by this latter. The arm 51 is caused to ascend and descend several times in succession during a period of time capable of being regulated at will, as will be described hereinafter, in such a manner as to completely effect the calcination of the mantles during the ascending and descending motion of the burners upon the bars 56 and 57. As has been before described, the extent of these oscillations goes on decreasing each time by reason of the displacement of the fulcrum 43 of the bar 42, Fig. 15, in such a manner that the burners "follow," so to speak, the mantles during their shrinking, and thus prevent the flames from leaving the mantles, which would occur if the motion of the burners were greater than the height of the mantles.

It is interesting to remark here that the calcination causes the mantles to shorten in length, because they shrink, and it is for this reason that we have been obliged to reduce the movement of the burners gradually as the calcination is carried out.

The time of calcination being terminated, the point 43, around which the bar 42 pivots, returns from the right to the left, Fig. 15, which therefore permits the arm 51 to descend to a lower level than that which it occupied at the beginning of its oscillations. In this descending movement the hook 54 encounters the end 70 of the plate 71, which pushes back the nose of the hook 53. It follows from this that when the arm reascends through the action of the cam $k'$ it no longer encounters 53, and consequently rises without taking along the piece 52 and the burners. On arriving at the upper end of its stroke the arm passes above the hook 59, which was stationary because it was not moved along with the piece 52. This hook retires, so as to allow passage to the post. In redescending the arm takes along the hook 59, fixed upon the rod 58, and consequently, through the intervention of the band 62, causes the bar 67 to rise, and with it also the forms, which close above the burners in the middle of the lower opening of the mantles. This movement of the forms is interesting to note, because when fresh mantles are introduced to replace those that have been calcined and when the burners rise they cause the forms to open, so as to act upon the mantles which may have closed during the displacement. During the lowering of the rod 58 through the action of the arm the protruding part 68 acts against the hook 72, which pivots around its axis 73 in such a manner as to engage the beak 74 in the slot formed in the piece 52. When the arm reascends, leaving the hook 59, which under the action of the helical spring mounted upon its axis retires immediately, it encounters the nose 74 of the hook 72 and slightly lifts it in such a manner as to produce the following two results: First, the disengagement of the hook 54 of the stop 70, which has the effect of introducing the nose 53 of the said hook into the slot 52; second, by lifting the whole of the piece 52 and transverse bars 57 and 56 it lifts slightly also the burners across the forms in such a manner as to give but little flame in the interior of the mantles. The hook 72, which has thus been lifted, taking with it the piece 52, engages a spring-tappet, whereby it is kept suspended in order to prevent the piece 52 at the next descending movement of the post to be lowered by the action of the weight. The arm 51 redescends, pushes the nose 53 of the hook 54 out of its path, and takes up a position beneath it, so that at the next ascension it takes with it the assemblage of the pieces, as has already been explained, thereby restarting the vertical reciprocating motion for a period capable of regulation in the manner hereinafter explained.

We will next show how the period for calcination is regulated by referring more particularly to Figs. 12, 13, and 14. The eccentric $k$, which, as before stated, is keyed on the shaft $j$, acts on a slotted link 75, capable of oscillating on a pivot 75' and operated by the eccentric $k$. The slotted link is furnished with a roller 77, adapted to strike at every oscillation against a tappet 78, fixed to the bar 76, which latter is capable of performing a to-and-fro motion. This motion is obtained from left to right, Fig. 12, by the action of the roller 77 acting against the tappet 78, and the return motion of the said bar 76 is produced by the action of a counterpoise 79 acting on a rod 80. This bar 76 is fitted with two pawls, one, 81, pivoted at 82, and the other, 83, pivoted at 84. The pawl 81 is capable of engaging in the teeth formed in a bar 85, guided by rollers 86. The other pawl 83 is adapted to engage with the teeth of a bar 45, guided by rollers 87. The pawl 83, which, as is known, follows the movements of the bar 76, causes at every displacement of the said bar from left to right, Fig. 12, the bar 45 to be moved by its teeth. For adjusting the displacement of the bar 45 we arrange above the teeth thereof an angle-plate 300, Fig. 12$^b$, adjustably secured to a suitable fixed part of the machine (not shown) by screws passing through slots 301. It follows that for a certain period of the displacement from left to right the pawl 83 slides over the plate 300 in the position shown in dotted lines, Fig. 12$^b$, without engaging the teeth of the bar 45, and consequently the displacement of the latter takes place only when the pawl is no longer lifted by the plate and drops into a tooth of the bar 45, as shown in full lines, Fig. 12$^b$. In this manner it will be easy to adjust the displacement of the bar 45 and also the speed of displacement of the axis 43, which forms the pivot for the lever 42, so that by these means the amplitude of the motions of the post 51 may be reduced more or less rapidly. The bar 45 is subjected, as seen from Fig. 12, to the action of a counterpoise 90, which constantly tends to return it from the right to the left; but this cannot be effected at once, while the pawl 91, which is nothing but an ordinary retaining-pawl, is engaged in one of the teeth. We will remark here that all these parts are doubled—i. e., that there is one at each side of the machine—and in order to render the movements of the two bars 45 synchronous we have provided at the rear of these bars at 92 two twin bars oscillating on the pivot 93, and thus forcing the two bars 45 to move always for the same length, remaining constantly parallel to each other. During the displacement of the bar 76 the pawl 81, mounted upon this bar, comes into engagement with one of the teeth of the bar 85, and consequently in the motion from left to right, Fig. 12, the bar 85 is operated by the pawl 81 for one tooth, owing to the arrangement of a plate 302, Fig. 12$^c$, disposed above the teeth and acting in the same manner as that placed above the teeth of the bar 45. The plate 302, placed over the teeth of the bar 85, is not adjustable, but is fixed, because the bar is to be moved only by one tooth each time. The bar 85 carries a rocking lever 95, pivoted on a stud 96, fixed to the bar, and this rocking lever is always kept in a vertical position by a spring 97, acting to maintain the lower extremity of the rocking lever applied against a stop 98. The rocking lever carries at its upper portion a stud 99. Owing to the successive displacements of the bar 85, the rocking lever 95, moving little by little, always in the same direction, arrives finally at the lower end of the piece 100, which pivots around the axis 101, fixed to the frame $l$. The lower end of the said swivel-piece 100 carries a tail 102, against which acts the rocking lever 95. Through the action of the rocking lever 95, which cannot rotate in the direction of the arrow, Fig. 12, the piece 100 is caused to pivot around the axis 101 and allow the hook 103 to fall and to engage with the traverse 104, connecting the two cheeks 105 of the slotted link 75. By reason of the fall of the hook 103 upon the traverse 104 the frame $l$ is connected with the slotted link of the eccentric, which latter thus moves it from right to left and back, whereupon the hook is lifted, as hereinafter explained, and disengages the frame $l$. At the same time the stud 99 of the rocking lever 95 strikes against the lower extremity of the beak 106, integral with the retaining-pawl 91. By the action of the stud 99 upon the beak 106 the pawl 91 is raised, so as to leave the bar 45 and allow the latter to return at once to its position by the action of the counterpoise 90. This movement of the bar 45 from right to left, Fig. 12, effects the displacement of the fulcrum 43 of the lever 42 and the returning of the bar to its initial point. It is at that moment, as we have already seen, that the arm 51 is enabled to fall and allow the hook 54 to retire by striking against the projection 70. In this position the burners are arrested during a revolution of the eccentric $k$ and the forms raised above the burner. During the revolution of the eccentric $k'$ the eccentric $k$ also performs a revolution, and the bar 76 accomplishes a to-and-fro motion and at its return carries with it the pawl 83, which engages the teeth of the bar 45 and then leaves the same, allowing it to return to the end of its stroke at the left through the action of the counterpoise 90, because the retaining-pawl 91 is during this time kept in its raised position. At the moment when the bar 45 has returned a second time to the end of its stroke at the left it is necessary to disengage the bar 85 to allow it to return to its initial point, so that at the next oscillations the same operations take place. The bar 85 is constantly retained by the pawl 110, and upon the said bar there is mounted a stud 111, which at the moment of the last displacement of the bar 85 toward the right through the action of the pawl 81 comes against the upper end of a bent lever 112 in such a manner as to depress the extremity 113 of such lever, which latter oscillates upon a pivot 114. When the eccentric 75 next returns from the right to the left, the stud 115 strikes against the extremity of the bent lever 112, causing it to swing and to lift with its upper end the retaining-pawl 110. The bar 85 now being no longer retained is caused to return to its starting-point by the action of a counterpoise (not shown, but similar to counterpoise 79) on a bar 94. Thus all the parts are in their position of starting, and when the eccentric again swings from left to right the operations recommence in the same order.

It will be appropriate here to state how the hook 103 has been lifted for disengaging the frame $l$. We have seen previously how the hook 103 has been lowered through the contact of the rocking lever 95 with the stud 102 of the lever 100. The hook 103 having fallen into engagement with the traverse 104, the frame $l$ is actuated by the movement of the eccentric 75 or, more precisely, during its oscillation from right to left and back from left to right. This latter motion produces the displacement of the different series of mantles within the apparatus—that is to say, that those first prepared arrive for the firing, those already fired pass on to the calcination, and those last calcined are transported farther along within the apparatus. At the return of the eccentric during its oscillation from left to right the nose 120 strikes against the fixed arm 121 and turns, while also forcing the lever 100 on the same shaft 101 to turn, so as to lift the hook 103 in such a manner as to disengage the traverse 104 and to again render the frame $l$ stationary during the next oscillation of the eccentric.

It now remains only to study the arrangement of the burners and the regulation of the flames in connection with the calcinating mechanism by referring more particularly to Figs. 2, 9, 10, and 11. Each burner 123, properly speaking, is mounted at the extremity of a movable tube 124, which at its lower end carries a pulley 150, operated by a cable or cord 126. At the center of the movable tube 124 there is disposed a fixed tube 125, screwed into a hollow piece 127, supported by the traverses 56 and 57. The hollow piece 127 is fitted with two nozzles 128 and 129 with taps, one for the supply of air and the other for the gas. Each tap carries a pulley, and these pulleys are subjected to the action of the rods 130 and 131, adapted to be operated from the side of the machine, so as to open or close the said taps or, more distinctly speaking, to lower the flames to a glimmer. If gas under pressure is used for calcinating, obviously the air-supply taps will not be required. This operation of the rods 130 and 131 may be effected automatically in the following manner: The two rods 130 and 131 carry at one of their extremities studs adapted to engage in slots in a sector 132, pivoted on an axis 133 and acted upon by a counterpoise 134. When the assemblage of the two transverse bars 56 and 57 descends, the rod of the counterpoise 134 comes against a fixed tappet 135, whereby the rods 130 and 131 are so moved as to lower the flames. When, on the contrary, the rods 56 and 57 are raised, so as to begin the oscillatory motions of variable amplitude, as hereinbefore described, the counterpoise 134 acts, because it is no longer arrested by the tappet 135, and thus returns the rods 130 131 into their initial position for opening the taps. Around the movable tube 124, which supports the burner, there is arranged a fixed tube 140, which to some extent acts as a protector to the movable tube. The movement of the tubes 124 is obtained, as we have stated, by means of the cable 126 passing over the pulleys 150. This endless cable is wound twice around a pulley 151, mounted upon a movable spindle 152, Fig. 2, which at the same time serves as a guide for the assemblage of burners. The rotary motion for the spindle 152 is obtained through a friction-wheel 153 in contact with the face of the gear-wheel $i$. The movability of the tubes has for object the equal repartition of the flame at the interior of each mantle.

We will now describe the steeping mechanism and that for delivering the mantles from the machine by causing them to pass through a drying-chamber.

In the following description we will refer more particularly to Figs. 3 and 5, which show details of the various parts required for the steeping operation. As is known, this operation consists in impregnating the calcined mantles with collodion or other appropriate liquid or semiliquid substance for giving the mantles the necessary stiffness for manipulation and for safety in transit. The shaft $w$ is prolonged toward the rear of the machine and is fitted with a worm 160 in gear with a worm-wheel 161, mounted upon the shaft 162, carrying an eccentric 163. The rotation of the eccentric causes a roller 164, fixed to a rod 165, to rise or to fall, and thus allow the said rod to follow the motions of the eccentric. This vertical bar 165 is formed with a recess 166, in which at certain moments the lower extremity 167 of a hook 168 engages, as is hereinafter explained. This hook is pivoted at 169 and is constantly subjected to the action of a spring tending to engage the extremity 167 in the recess 166. Upon the spindle 170 is mounted a sector 171, adapted to oscillate around the said axis and formed with a recess 172. Normally the sector is retained in its vertical position by a counterpoise 173, acting in conjunction with a stop 174. When the frame $l$, Fig. 12, is moved by the slotted link 75 from the right to the left, Fig. 5, the stud or tenon 175 encounters the vertical face 176 of the sector 171. This causes the latter to pivot around the shaft 170, and at that moment the hook 168, which had been held back, falls upon the recess in such a manner that the eccentric 163 in turning can, through the intervention of the recess 166 and the extremity 167 of the hook, raise the bar 180, to which the hook 168 is pivoted, as this bar 180 is connected with two transverse bars 181 182, which carry the various vessels 183 containing the collodion or other convenient substance. These vessels are thus elevated through the action of the eccentric, so as to immerse the mantles 26, suspended above. At the return of the frame $l$ from left to right the stud 175 leaves the sector 171, whereupon the counterpoise 173 returns it to its vertical position, and thereby forces the hook 168 at the descent of the rod 180 to retire, and cause the eccentric 163 once more and till a renewed displacement of the frame $l$ to rotate without acting upon the vessels 183. The various vessels are retained in place by appropriate fittings disposed between two traverses 181 and 182. As the collodion is a highly-inflammable liquid, it is necessary, as will be readily understood, to isolate it from the parts of the machine where the gas-jets are situated. To this end we have disposed at 190 a partition for isolating the entire rear portion of the machine. At 191 is a door, part of which opens upwardly, while the other part turns down. The opening of this door in the direction of the arrows, Fig. 5, is effected by two fittings 192, each consisting of a bowed strip adapted to push the door open at its middle, one strip provided at each side of the apparatus and fixed to the frames $l$. When the said frames move from the right to the left, the fittings 192 effect the opening of the door, and when the frames $l$ return from the left to the right these fittings, while being moved, maintain, nevertheless, the doors open during the time required for the passage of a series of mantles carried along by one of the rods $m$. Two counterweights, Fig. 5, tend, respectively, to normally hold the two parts of the door closed. After the steeping the different rods, accompanied by the pawls $o$, accumulate one after the other in a drying-chamber 200. The series of mantles advance in this chamber one after the other by being pushed along a continuous path 201. A draft flue or chimney 203 causes a hot-air current in the interior of this chamber, the required draft being furnished by the chimney 204, into which flow the combustion-gases resulting from the firing and the calcination.

With a view of isolating as far as possible the collodion and avoiding all danger of fire through the vapors while the vessels 183 are stationary they are closed by a cover 205. This cover is operated by a rod 206, adapted to pivot around a stationary axis 207 and carrying at its lower portion a rod 208, fitted at one end by a counterpoise 209. When, on the contrary, the vessels are elevated for the steeping operation, the lower part of the frame on which they repose no longer rests upon the rods 208, and the counterpoise 209 then removes the cover 205 from the right to the left, so as to allow of the mantles being immersed in the pots.

What we claim is—

1. In a machine for treating a structure to produce an incandescent mantle originally consisting of a fabric impregnated with a suitable substance, the combination of a series of devices suitable for treating the structure, means for intermittently moving the structure from one to another of the treating devices and means for producing operative relative positions between said treating devices and the intermittently-moving structure when the structure is at rest.

2. In a machine for treating a structure to produce an incandescent mantle originally consisting of a fabric impregnated with a suitable substance, the combination of a series of devices for treating the structure, a traveling support for the structure, means for intermittently moving said support from one to another of the said treating devices, and means for producing operative relative positions between said treating devices and the intermittently-moving structure when the structure is at rest.

3. In a machine for treating a structure to produce an incandescent mantle originally consisting of a fabric impregnated with a suitable substance, the combination of a series of devices for treating the structure, a traveling support for the structure, means for intermittently moving said support from one to another of the said treating devices, and means for producing operative relative positions between said treating devices and the intermittently-moving structure when the structure is at rest.

4. In a machine for treating a structure to produce an incandescent mantle originally consisting of a fabric impregnated with a suitable substance, the combination of means for destroying the fabric and for causing an oxidation of the substance, other means for hardening the oxidized substance, still other means for applying a stiffening solution, a traveling support for the structure, means for intermittently moving said traveling support, and means for producing a relative movement between said traveling support and some of said several treating means transverse to that movement of the traveling support which is from one treating means to the next, whereby the structure and said means which are moved will be in such relation one to the other as to have the structure treated.

5. In a machine for treating a structure to produce an incandescent mantle originally consisting of a fabric impregnated with a suitable substance, the combination of a traveling support for the structure, means for intermittently moving said traveling support, a series of treating devices for said structure comprising movable tables, and means for moving said movable tables toward and away from the structure.

6. In a machine for treating incandescent-light mantles, a series of mechanisms for performing different steps of the treatment, carriers upon which the mantles are suspended, means for intermittently advancing the carriers to the different mechanisms *seriatim*, and means for producing operative relative positions between the said mechanisms and the intermittently-moving mantles when the latter are at rest.

7. In a machine for treating incandescent-light mantles, a series of mechanisms for performing different steps of the treatment, carriers upon which the mantles are suspended, means for simultaneously and intermittently advancing the carriers to bring them successively to the different mechanisms *seriatim*, and means for producing operative relative positions between the said mechanisms and the intermittently-moving mantles when the latter are at rest.

8. In a machine for automatically treating incandescent-light mantles, firing mechanism, calcinating mechanism, dipping mechanism, carriers upon which the mantles are suspended, means for intermittently advancing the carriers to the different mechanism *seriatim*, and means for moving said mechanisms into operative relation to the intermittently-moving mantles when the latter are at rest.

9. In a machine for treating incandescent-light mantles, a series of mechanisms for performing different steps of the treatment, carriers upon which the mantles are suspended, a way leading to the mechanisms in succession, propelling mechanism for intermittently moving the carriers along the way, and means for moving said mechanism and mantles into operative relation when the mantles are at rest.

10. In a machine for treating incandescent-light mantles, a series of mechanisms for performing different steps of the treatment, carriers upon which the mantles are suspended, a way leading to the mechanisms in succession, propelling mechanism adapted to simultaneously and intermittently operate upon a plurality of carriers to move them along the way, and means for moving said mechanisms and mantles into operative relation when the mantles are at rest.

11. In a machine for treating incandescent-light mantles, a series of mechanisms for performing different steps of the treatment, carriers upon which the mantles are suspended, means for intermittently advancing the carriers to the different mechanism *seriatim*, and means for moving the mechanisms into operative relation to the mantles when the latter are at rest.

12. In a machine for treating incandescent-light mantles, a series of mechanisms for performing different steps of the treatment, carriers upon which the mantles are suspended, means for simultaneously and intermittently advancing the carriers to the different mechanisms *seriatim*, and means for moving the mechanisms into operative relation to the mantles when the latter are at rest.

13. In a machine for treating incandescent-light mantles, a series of mechanisms for performing different steps of the treatment, carriers upon which the mantles are suspended, a way leading to the mechanisms in succession, a reciprocatory frame, means for reciprocating the frame, catch devices arranged at intervals along the frame adapted to engage the carriers and move them along the way on the forward movement of the frame only, and means for moving said mechanism and mantles into operative relation when the mantles are at rest.

14. In a machine for automatically treating incandescent-light mantles, firing mechanism for igniting the previously-prepared mantles, holders from which the mantles are suspended, propelling mechanism for moving the holders through the machine, forms adapted to engage in the open ends of the mantles to hold the same open or spread during the firing operation, form-operating mechanism for successively engaging the forms in the mantles respectively in advance of the firing mechanism, and propelling mechanism for moving the forms to the firing position simultaneously with the movement of the mantles.

15. In a machine for automatically treating incandescent-light mantles, firing mechanism for igniting the previously-prepared mantles, holders from which the mantles are suspended, propelling mechanism for moving the holders through the machine, forms adapted to engage in the open ends of the mantles to hold the same open or spread during the firing operation, elevating means for raising the forms into the lower open ends of the mantles in advance of the firing mechanism, propelling mechanism for moving the forms to the firing position simultaneously with the movement of the mantles, and lowering mechanism for withdrawing the forms from engagement with the mantles at the end of the firing operation.

16. In a machine for treating incandescent-light mantles, calcinating mechanism comprising one or more burners, reciprocating means therefor, and automatically-operating regulating means for varying the amplitude of reciprocation of the burner or burners to compensate for the contraction of the mantles during calcination.

17. In a machine for treating incandescent-light mantles, calcinating mechanism comprising one or more burners, reciprocating means therefor, automatically-operating regulating means for varying the amplitude of reciprocation of the burner or burners to compensate for the contraction of the mantles during calcination, and regulating means for varying the rapidity of the change of amplitude and the duration of the calcination period.

18. In a machine for treating incandescent-light mantles, calcinating mechanism comprising one or more burners, forms or spreaders operating in conjunction with the burners, means for elevating the forms above the burners and into the lower ends of the mantles for opening or spreading the same for entry of the burners at the beginning of the calcinating operation, and means for reciprocating the burners.

19. In a machine for treating incandescent-light mantles, calcinating mechanism comprising one or more burners valves controlling the supply of gas to said burners, means for elevating and lowering the burners to bring the flame into and out of action on the mantles, and automatic valve-operating means acting to open the valves to increase the burner-flame when the burners are elevated and to close the valves to lower the burner-flame when the burners are lowered.

20. In a machine for treating incandescent-light mantles, calcinating mechanism comprising one or more burners, and burner-rotating mechanism for rotating the burners and thereby equalizing the calcinating effect over the entire surface of the mantle.

21. In a machine for treating incandescent-light mantles, mechanism for steeping the mantles in a preserving liquid comprising a vessel or vessels containing the steeping liquid, and automatically-operating mechanism for raising and lowering said vessel or vessels to momentarily submerge the mantles in the steeping liquid.

In testimony whereof we have signed this specification in the presence of two subscribing witnesses.

JEAN LEON MULLER.
JOSEPH BONNET.

Witnesses:
EMILE LEOPEL,
EDWARD P. MACLEAN.